United States Patent
Liles et al.

(10) Patent No.: US 7,553,549 B2
(45) Date of Patent: Jun. 30, 2009

(54) ENGINEERED WOOD BOARDS WITH REDUCED VOC EMISSIONS

(75) Inventors: W. Terry Liles, Jefferson, GA (US); Nian-hua Ou, Dacula, GA (US); Brian M. Peek, Cornelia, GA (US)

(73) Assignee: Huber Engineered Woods LLC, Charlotte, NC (US)

( * ) Notice: Subject to any disclaimer, the term of this patent is extended or adjusted under 35 U.S.C. 154(b) by 8 days.

(21) Appl. No.: 11/362,950

(22) Filed: Feb. 27, 2006

(65) Prior Publication Data
US 2007/0202346 A1    Aug. 30, 2007

(51) Int. Cl.
*B32B 5/66* (2006.01)

(52) U.S. Cl. .................. 428/532; 428/535; 428/536; 428/537.1; 427/408

(58) Field of Classification Search .......... 428/524, 428/528, 535, 536, 532, 537.1; 525/498; 427/408
See application file for complete search history.

(56) References Cited

U.S. PATENT DOCUMENTS

| | | | |
|---|---|---|---|
| 4,364,984 A | 12/1982 | Wentworth | |
| 4,501,628 A * | 2/1985 | McGuire et al. | 156/62.8 |
| 4,569,873 A | 2/1986 | Robbins | |
| 5,648,138 A | 7/1997 | Tingley | |
| 5,736,218 A | 4/1998 | Iwata et al. | |
| 5,888,620 A | 3/1999 | Grenier | |
| 6,303,207 B1 | 10/2001 | Kajander | |
| 6,331,339 B1 | 12/2001 | Kajander | |
| 6,399,719 B1 * | 6/2002 | Dopico et al. | 525/498 |
| 6,461,743 B1 | 10/2002 | Tanzer et al. | |
| 2001/0021448 A1 | 9/2001 | Kajander | |
| 2002/0074095 A1 | 6/2002 | Wierer et al. | |
| 2003/0153721 A1 | 8/2003 | Zhu et al. | |
| 2004/0157519 A1 | 8/2004 | Goodell et al. | |
| 2005/0003147 A1 | 1/2005 | Torrey | |
| 2006/0032167 A1 | 2/2006 | Cecilio et al. | |

* cited by examiner

*Primary Examiner*—Leszek Kiliman

(57) ABSTRACT

Disclosed is a wood panel having a core layer, and upper and lower surface layers, the surface layers comprising a melamine urea formaldehyde surface resin, wherein the melamine urea formaldehyde surface resin is a product of reaction reagents, the reaction reagents comprising: about 5 to about 25 wt % melamine; about 5 to about 20 wt % urea; about 15 to about 30 wt % formaldehyde; and water.

19 Claims, No Drawings

ENGINEERED WOOD BOARDS WITH REDUCED VOC EMISSIONS

BACKGROUND OF THE INVENTION

In recent years, consumers have become much more interested in healthy and environmentally-friendly lifestyles and products. Indoor air quality is one particular example of this heightened health and environment consciousness. A wide range of products from HIPPA air filters to radon detectors are now available to help consumers monitor and control the quality of air that is breathed indoors.

Indoor air quality is particularly pertinent to makers of construction and building materials, because indoor air quality can be affected by the level of organic materials such as volatile organic compounds ("VOCs") that are emitted by construction materials, such as carpets, furniture, finishes, paints, and ceiling tiles.

Engineered wood construction materials used to form the framework and supporting structure of buildings are another example of constructions materials that contribute to indoor VOC emissions. These engineered wood construction materials, are formed from lignocellulosic strands bonded together by adhesive resins. Examples of such engineered wood materials include plywood, particle board and oriented strand board ("OSB"). For example OSB is made from lignocellulosic strands selected from pine, aspen, oak, maple, fir, gums, and possibly other wood species, while the adhesive resin is present in concentration ranges of 2% to 12% on the surface and may include adhesives such as melamine, urea, phenol, and formaldehyde or melamine, urea, and formaldehyde; pMDI resin at application levels of 1% to 6% is used in the core of the material and also added is emulsion or slack wax.

As can be seen from the list of product ingredients above, these engineered wood products contain VOCs which may be released during the lifetime of a building or structure made from the engineered wood products. These VOCs include formaldehyde, methanol, pinene, and other olefins and aldehydes. While adhesive resins are a typical source of VOCs, the wood itself may be a more significant source of VOCs; for example pine is a significant source of the aforementioned pinene emissions. But the specific VOCs and the quantity in which they are emitted will vary with each individual wood species. Some of these compounds are regulated by OSHA as well as the EPA as hazardous air pollutants at high concentration levels. For example, formaldehyde emissions from building materials used for constructing mobile homes are already rather strictly regulated.

Commonly made engineered wood panels such as aspen wood strands bonded with pMDI adhesive generate lower VOC emissions than other types of engineered wood and pass the special certification standards used in the industry to denote "green" products, i.e. products that meet heightened environmental and health standards. However, engineered wood panels made from other raw materials, such as pine strands, typically have higher VOC emissions. These VOC emissions are sufficiently high that pine-containing engineered wood material does not meet the standards for green certification.

Accordingly, there is a need in the art for a pine-containing engineered wood material with significantly reduced VOC emissions so that the material will meet heightened environmental and health standards.

BRIEF SUMMARY OF THE INVENTION

The present invention includes a wood panel comprising: a composite wood component having a core layer, and upper and lower surface layers, the surface layers comprising a melamine urea formaldehyde surface resin, wherein the melamine urea formaldehyde surface resin is a product of reaction reagents, the reaction reagents comprising: about 5 to about 25 wt % melamine; about 5 to about 20 wt % urea; about 15 to about 30 wt % formaldehyde; and water.

The present invention also includes a process for preparing an engineered wood panel comprising the steps of: preparing a melamine urea formaldehyde surface resin by a reaction of reagents comprising: about 5 to about 25 wt % melamine; about 5 to about 20 wt % urea; about 15 to about 30 wt % formaldehyde; and water.

DETAILED DESCRIPTION OF THE INVENTION

All parts, percentages and ratios used herein are expressed by weight unless otherwise specified. All documents cited herein are incorporated by reference.

As used herein, "wood" is intended to mean a cellular structure, having cell walls composed of cellulose and hemicellulose fibers bonded together by lignin polymer.

By "laminated", it is meant material composed of layers and bonded together using resin binders.

By "engineered wood material" or "wood composite component" it is meant a composite material that comprises wood and one or more other additives, such as adhesives or waxes. Non-limiting examples of wood composite materials include oriented strand board ("OSB"), structural composite lumber ("SCL"), waferboard, particle board, chipboard, medium-density fiberboard, plywood, and boards that are a composite of strands and ply veneers. As used herein, "flakes", "strands", and "wafers" are considered equivalent to one another and are used interchangeably. A non-exclusive description of wood composite materials may be found in the Supplement Volume to the Kirk-Othmer Encyclopedia of Chemical Technology, pp 765-810, $6^{th}$ Edition, which is hereby incorporated by reference.

The following describes preferred embodiments of the present invention, which provides an engineered wood panel having reduced VOC emissions. Because the VOC emissions of the engineered wood material are so low, the wood material meets the heightened environmental and health standards and is thus a more valuable building material.

The engineered wood panel of the present invention meets the heightened environmental and health standards by use of a special resin formulation system, which is described in greater detail, below.

Preferably, the engineered wood material or wood composite material is made from OSB material. The oriented strand board is derived from a starting material that is naturally occurring hard or soft woods, singularly or mixed, whether such wood is dry (having a moisture content of between 2 wt % and 12 wt %) or green (having a moisture content of between 30 wt % and 200 wt %). Typically, the raw wood starting materials, either virgin or reclaimed, are cut into strands, wafers or flakes of desired size and shape, which are well known to one of ordinary skill in the art.

After the strands are cut they are dried in an oven and then coated with a special formulation of one or more polymeric thermosetting binder resins, waxes and other additives. The binder resin and the other various additives that are applied to the wood materials are referred to herein as a coating, even though the binder and additives may be in the form of small particles, such as atomized particles or solid particles, which do not form a continuous coating upon the wood material. Conventionally, the binder, wax and any other additives are applied to the wood materials by one or more spraying, blending or mixing techniques, a preferred technique is to spray the wax, resin and other additives upon the wood strands as the strands are tumbled in a drum blender.

After being coated and treated with the desired coating and treatment chemicals, these coated strands are used to form a multi-layered mat, preferably a three layered mat. This layering may be done in the following fashion. The coated flakes are spread on a conveyor belt to provide a first ply or layer having flakes oriented substantially in line, or parallel, to the conveyor belt, then a second ply is deposited on the first ply, with the flakes of the second ply oriented substantially perpendicular to the conveyor belt. Finally, a third ply having flakes oriented substantially in line with the conveyor belt, similar to the first ply, is deposited on the second ply such that plies built-up in this manner have flakes oriented generally perpendicular to a neighboring ply. Alternatively, but less preferably, all plies can have strands oriented in random directions. The multiple plies or layers can be deposited using generally known multi-pass techniques and strand orienter equipment. In the case of a three ply or three layered mat, the first and third plys are surface layers, while the second ply is a core layer. The surface layers each have an exterior face.

The above example may also be done in different relative directions, so that the first ply has flakes oriented substantially perpendicular to conveyor belt, then a second ply is deposited on the first ply, with the flakes of the second ply oriented substantially parallel to the conveyor belt. Finally, a third ply having flakes oriented substantially perpendicular with the conveyor belt, similar to the first ply, is deposited on the second ply.

Various polymeric resins, preferably thermosetting resins, may be employed as binders for the wood flakes or strands. Suitable polymeric binders include isocyanate resin, urea-formaldehyde, polyvinyl acetate ("PVA"), phenol formaldehyde, melamine formaldehyde, melamine urea formaldehyde ("MUF") and the co-polymers thereof. Isocyanates include diphenylmethane-p,p'-diisocyanate group of polymers, which have NCO— functional groups that can react with other organic groups to form polymer groups such as polyurea, —NCON—, and polyurethane, —NCOO—; a binder with about 50 wt % 4,4-diphenyl-methane diisocyanate ("MDI") or in a mixture with other isocyanate oligomers ("pMDI") may be used. A suitable commercial pMDI product is Rubinate 1840 available from Huntsman, Salt Lake City, Utah, and Mondur 541 available from Bayer Corporation, North America, of Pittsburgh, Pa. Suitable commercial MUF binders are the LS 2358 and LS 2250 products from the Dynea corporation.

An important aspect of the present invention is that the surface resin composition in the surface layer is specially prepared by a condensation reaction of about 5 to about 25 wt % melamine and about 5 to about 20 wt % urea with about 15 to about 30 wt % formaldehyde optionally followed by the step of a condensation reaction with about 0.1 to about 10 wt % phenol compound (all weight percentages are based on the total weight of the reagents in the condensation reactions), with the balance being water and/or other constituents. The surface layer contains about 4 wt % to about 12 wt % of the surface resin composition.

In addition to the aforementioned surface resin composition, the surface may also include a powdered phenol-formaldehyde resin, present in a concentration of about 0.2 wt % to about 4 wt %, although the desired amount will depend on the wood species and desired properties; determining such desired amount in view of these factors is well within the level of a person of ordinary skill in the art. The powdered phenol-formaldehyde resin is added primarily to reduce strand pops in the finished surface due to curled stands in the mat.

The core layer contains an isocyanate (preferably pMDI) adhesive at a concentration of about of 1 to about 6 wt %. A wax additive is commonly employed to enhance the resistance of the OSB panels to moisture penetration. Preferred waxes are slack wax or an emulsion wax. The wax solids loading level is preferably in the range of about 0.5 wt % to about 3.0 wt % (based on the weight of the wood).

After the multi-layered mats are formed according to the process discussed above, they are compressed under a hot press machine that fuses and binds together the wood materials, binder, and other additives to form consolidated OSB panels of various thickness and sizes. The high temperature also acts to cure the binder material. Preferably, the panels of the invention are pressed for 2-15 minutes at a temperature of about 175° C. to about 240° C. The resulting composite panels will have a density in the range of about 35 lbs/ft$^3$ to about 48 lbs/ft$^3$ (as measured by ASTM standard D1037-98). The thickness of the OSB panels will be from about 0.6 cm (about ¼") to about 3-4 cm (about 1.5").

The invention will now be described in more detail with respect to the following, specific, non-limiting examples.

EXAMPLES

Several wood panels were made according to the prior art and to the present invention. The starting materials were pine strands with 60 wt % distributed in the surface layers, and 40 wt % distributed in the core layer. The resin in the core was maintained constant at 5 wt % pMDI for panels, however the MUPF resin in the surface layers was varied to four different concentration levels, 6 wt %, 8 wt %, 10 wt %, 12 wt %. The surface layer also contained 2% powdered PF resin. The panels were then pressed at temperature of 215° C., for a time of 260 seconds (including a 25 second ventilation stage) to produce a board having a thickness of 23/32 inch and a density of 43 pcf.

The wood panels were then tested for their VOC emissions. In particular, the panels were tested to determine if they meet the Green Guard® certification standard established by the Green Guard Institute. The standard requires that the material contain total VOCs of less than 500 mcg/m$^3$, formaldehyde levels of less than 0.05 ppm, and total aldehydes of less than 0.100 ppm.

The results of these measurements are set forth below:

TABLE I

| % MUPF applied in surface | Total VOC (micrograms/m$^3$) | Formaldehyde (ppm) | Total Aldehydes (ppm) |
|---|---|---|---|
| 12 | 413 | .008 | .014 |
| 10 | 140 | .008 | .013 |
| 8 | 280 | .006 | .006 |
| 6 | 357 | .008 | .014 |

As can be seen above, all of the samples prepared according to the present invention met or exceeded the Green Guard standard.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A wood panel comprising a core layer, and upper and lower surface layers,
    wherein the surface layers comprise a first resin,
    wherein the first resin is a melamine urea formaldehyde resin condensation reaction product of reaction reagents comprising:
        about 5 to about 25 wt % melamine;
        about 5 to about 20 wt % urea;
        about 15 to about 30 wt % formaldehyde; and
        water;
    wherein the surface layers contain about 4 wt % to about 12 wt % of the first resin; and
    wherein the core layer comprises a second resin different from the first resin.

2. The wood panel according to claim 1, wherein the wood panel is oriented strand board.

3. The wood panel according to claim 1, wherein the reaction reagents further comprise about 0.1 to about 10 wt % of a phenol compound.

4. The wood panel according to claim 3, wherein the phenol compound is phenol formaldehyde.

5. The wood panel according to claim 1, wherein the surface layers further comprise about 0.1% to about 4% of a powdered phenol-formaldehyde resin.

6. The wood panel according to claim 1, wherein the core layer comprises about 1 wt % to about 6 wt % isocyanate resin.

7. The wood panel according to claim 6, wherein the isocyanate resin is pMDI.

8. The wood panel according to claim 1, wherein the core layer, and the upper and lower surface layers are composed of strands selected from the group consisting of pine, aspen, oak, maple, fir, and gum strands.

9. A process for preparing an engineered wood panel comprising the steps of:
    coating wood strands with a first resin wherein the first resin comprises a reaction product of reagents comprising:
    about 5 to about 25 wt % melamine;
    about 5 to about 20 wt % urea;
    about 15 to about 30 wt % formaldehyde; and
    water;
    coating wood strands with a second resin which is different than the first resin;
    preparing a wood panel comprising a core layer, and upper and lower surface layers, wherein the surface layers contain about 4 wt % to about 12 wt % of the first resin, and wherein the core layer comprises the second resin.

10. The process according to claim 9, further comprising reacting the reagents of the first resin with about 0.1 to about 10 wt % phenol compound.

11. The process according to claim 10, wherein the phenol compound is phenol formaldehyde.

12. The process according to claim 9, wherein the core layer, and the upper and lower surface layers are composed of strands selected from the group consisting of pine, aspen, oak, maple, fir, and gum strands.

13. The panel of claim 1 wherein the surface layers contain about 6 wt % to about 12 wt % of the first resin.

14. The panel of claim 1 wherein the surface layers contain about 8 wt % to about 12 wt % of the first resin.

15. A wood panel comprising
    a) upper and lower surface layers comprising i) wood strands, ii) a first resin, and ii) about 0 to about 4 wt % of a second resin,
    wherein the first resin is a melamine urea formaldehyde resin which is a condensation reaction product of
    about 5 to about 25 wt % melamine;
    about 5 to about 20 wt % urea;
    about 15 to about 30 wt % formaldehyde;
    about 15 to about 75 wt % water;
    and further condensation reaction with
    about 0 to about 10 wt % phenol compound; and
    wherein the second resin is powdered phenol-formaldehyde (PF) resin, and
    b) a core layer comprising i) wood strands and ii) a third resin.

16. The panel of claim 15 wherein the third resin is an isocyanate resin.

17. The panel of claim 15 wherein the isocyanate resin is pMDI.

18. A method for reducing emissions in engineered wood materials comprising
    a) adding a first melamine urea formaldehyde (MUF) resin to wood strands,
    b) adding about 0 to about 4 wt % of a second formaldehyde-containing resin to the first resin or the first resin and wood strands mixture,
    d) adding a third resin to wood strands,
    d) forming an engineered wood material using each of the resin/wood strands mixtures,
    wherein the first resin and third resin are different and wherein the first resin/wood strands mixture is used in surface layers of the engineered wood material and wherein the third resin/wood strands mixture is used in a core layer of the engineered wood material.

19. The method of claim 18, wherein the emissions of the engineered wood material comprise
    a) a total VOC less than 500 mcg/m$^3$,
    b) a formaldehyde level of less than 0.05 ppm, and
    c) total aldehydes level of less than 0.100 ppm.

* * * * *